Nov. 28, 1950 — J. L. ESSEX ET AL — 2,531,975
METHOD AND APPARATUS FOR EXPANDING MINERALS
Filed April 19, 1947 — 3 Sheets-Sheet 1

INVENTORS
Jesse L. Essex
John R. Appleton
BY
atty.

Nov. 28, 1950  J. L. ESSEX ET AL  2,531,975
METHOD AND APPARATUS FOR EXPANDING MINERALS
Filed April 19, 1947  3 Sheets-Sheet 2

INVENTORS
Jesse L. Essex
John R. Appleton
BY
Atty.

Nov. 28, 1950   J. L. ESSEX ET AL   2,531,975
METHOD AND APPARATUS FOR EXPANDING MINERALS
Filed April 19, 1947   3 Sheets-Sheet 3
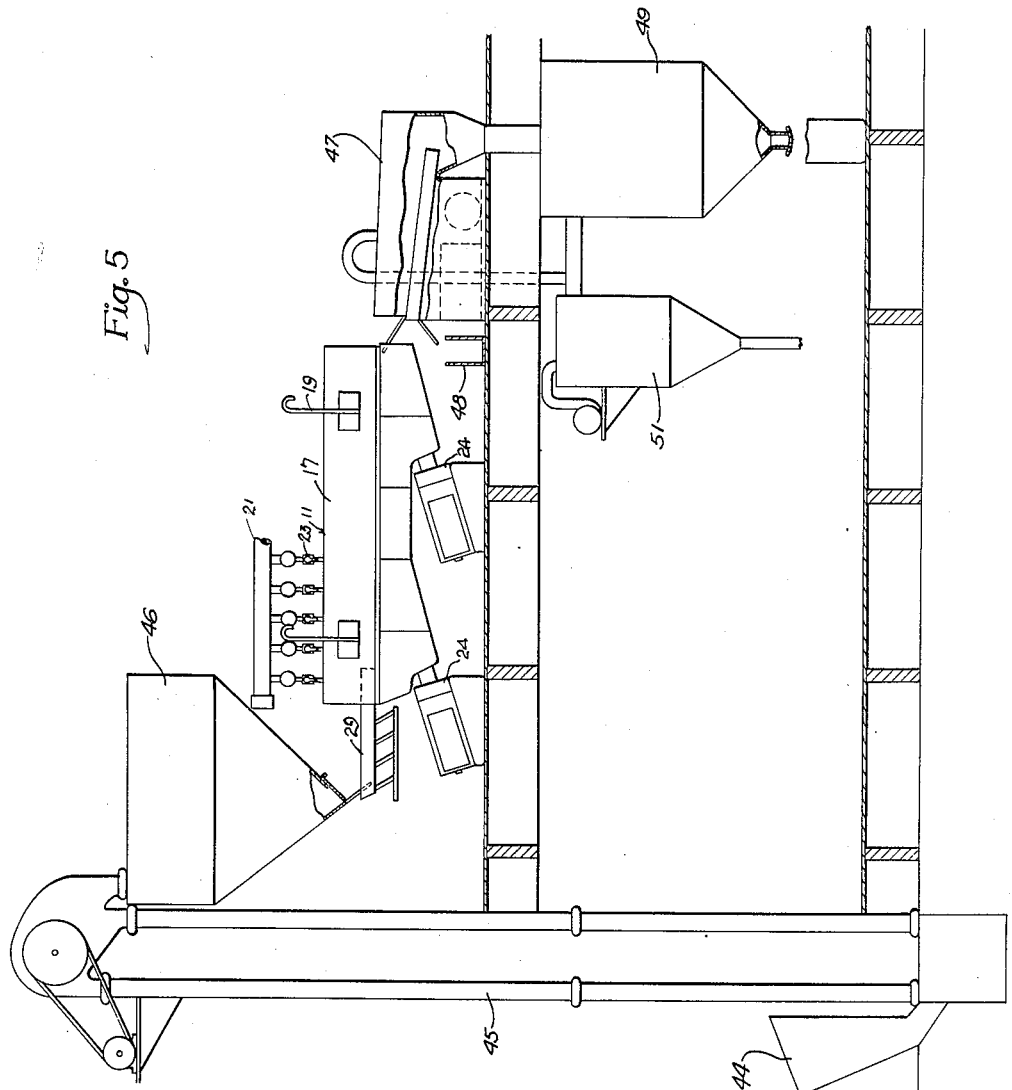
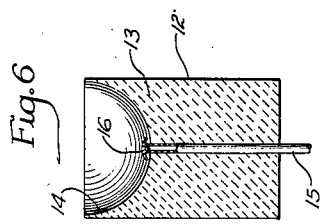
INVENTOR.
Jesse L. Essex
John R. Appleton
BY
Roland C. Rehm
Atty.

Patented Nov. 28, 1950

2,531,975

UNITED STATES PATENT OFFICE 2,531,975

METHOD AND APPARATUS FOR EXPANDING MINERALS

Jesse L. Essex, San Antonio, Tex., and John R. Appleton, Los Angeles, Calif.

Application April 19, 1947, Serial No. 742,544

5 Claims. (Cl. 252—378)

This invention relates to cellulating of rocks and ores, and among other objects, aims to provide improved process and apparatus for treating certain expandable rocks, shales and ores to cellulate them.

Another object is to provide heating apparatus presenting no dust hazard and wherein conditions of temperature, time and atmosphere are capable of careful control.

The nature of the invention may be readily understood by reference to the illustrative methods and apparatus embodying the invention and shown in the accompanying drawings.

In said drawings:

Fig. 5 is a diagram or flow chart of an illustrative process; and

Fig. 6 is a sectional view of an illustrative radiant heating element of the type used in the heater shown in Fig. 3.

Figures 1, 2:
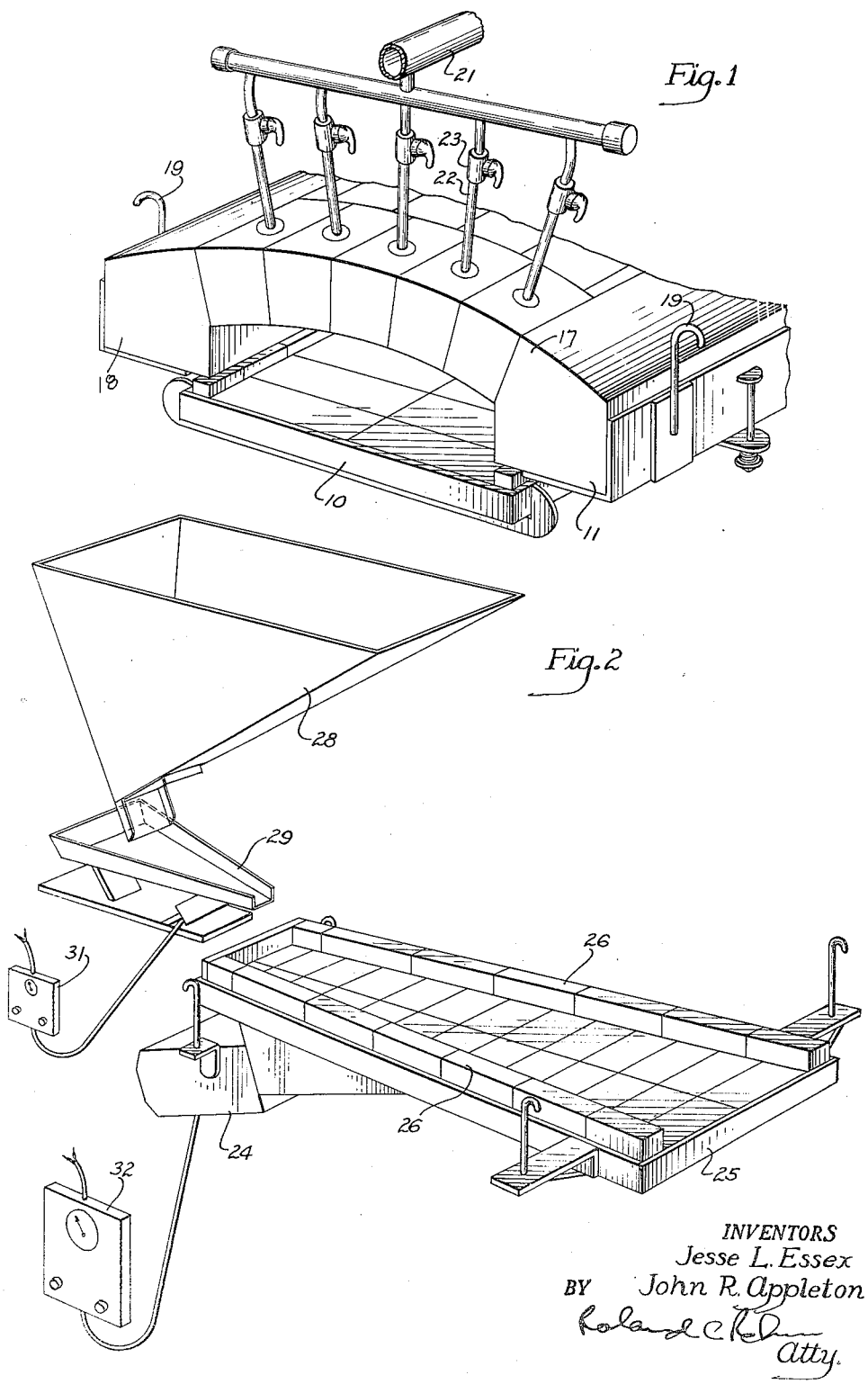
Fig. 1 is a perspective view of one form of a furnace for treating the material.
Fig. 2 is a perspective view of the apparatus for feeding the material through the furnace.

Among the rocks capable of expansion under the action of heat are: perlite, obsidian, pitchstone, versilicon, vitrophyre, tachylite, pumicite, and vitric or glassy tuffs, the most common of which are perlite, obsidian, pitchstone and versilicon. Certain shales when softened by heat expand similarly to the above rocks. Expandable ores are: vermiculite, jefferisite, kerrite, maconite, altered biotite, the most common of which are vermiculite and jefferisite. For convenience these ores will be referred to herein as vermiculite; and the rocks will be referred to as perlite.

The expanding phenomenon depends upon the physical structure and the presence of chemically combined water, etc. The volcanic glasses may be tubular, columnar, splintery, spherulic; while the vermiculites are predominately micaseous in character, characterized by a multitude of microscopically thin polished or shiny laminae. In the case of the expandable rocks, on quick heating to the softening point, the material puffs due to the conversion of the contained water into bubbles of steam. In the case of the ores, on quick heating the steam slightly separates the laminae causing expansion of the granules in a direction perpendicular to the laminae. In the case of both materials, quick heating to the proper temperature and control of heating are important.

Great difficulty has been experienced in treating the rock materials to secure the most efficient expansion or cellulation. One difficult problem is to heat quickly without overheating. In some instances rocks such as perlite when overheated are shattered or exploded without being properly cellulated; and often it is fused so that it conglomerates into large masses, or adheres to the walls of the heating furnace. We have discovered that this is due to improper heating and methods of heating. For example, when the material is heated even in part by conduction from hot gases, control is difficult or impossible. The hot gases will fuse exterior edges or corners of the rock granules without heating the entire granules to the proper temperature. Similarly, but to a lesser degree (since vermiculite need not be softened for expansion) improper heating impairs the quality of the expanded vermiculite. Over heating or prolonged heating excessively breaks up the vermiculite granules and renders them friable. Superficial fusing may also result.

The large volume and velocity of the gases necessary to supply heat unavoidably creates a dust hazard from dust picked up from the materials by the gases.

These difficulties can be overcome by the use of radiant energy in expanding the material. Energy is thus transferred directly to the granules of the material, and by them converted into heat. We have discovered that at the temperatures at which the aforesaid materials expand or puff, they become luminous or incandescent, and thereby become radiating bodies and re-radiate or retransmit radiant energy at a rate substantially corresponding to that at which they receive energy, and thereby do not absorb or store heat substantially in excess of that necessary to properly expand them. Thus, they cannot be fused or otherwise damaged even though the source of radiant energy be at a temperature exceeding the fusion point of the material treated. For example, in the range of temperatures from 1600° to 2300° F., perlite becomes luminous or incandescent and radiates energy. At about 2300° F. it radiates energy at substantially the rate it receives it and thus resists heating substantially above that temperature, even though the source of radiant heat be at a temperature above 2300° F., and can only be heated above that temperature very slowly, by which time the material will have passed out of the radiant field. For practical purposes, the source of radiant energy need not exceed 2300° F. for perlite. As another example, vermiculite while dark in color, has shiny or polished laminae which act as heat reflectors. This property in conjunction with the radiation of energy from the granules of vermiculite when they are heated to the exfoliating temperature range of 1200 to 1900° F., results in the reflection and radiation of heat at substantially the rate at which they receive energy. Since the sole source of heat energy is radiant energy, the granules themselves automatically resist absorption of excess energy which might result in fusion or damage.

The other expandable rocks and ores exhibit the same phenomena of becoming sources of radiant energy at their expanding temperatures, re-radiating or reflecting heat at their expanding temperatures at substantially the rates they receive energy.

Radiant heat is inherently directional and can, therefore, be concentrated practically exclusively on the materials to be expanded. It is not wasted on heating other masses of apparatus for example, and very little is absorbed by the intervening air. The latter does not circulate, and since it has such a very low specific heat and is of a small volume, it may be ignored. The intervening space may be considered for all practical purposes as a vacuum as regards transmission of energy to the material. Since heated air or gases play no part in the expanding process, no provision need be made for travel of heat carrying gases and the source of radiant energy may, therefore, be placed very closely to the materials so as to be of maximum effectiveness. Response to control is practically instantaneous. Changing the temperature of the source produces an immediate change on the material since there are no other sources of heat such as flame, hot gases or highly heated masses of apparatus to interfere with sensitive control.

Corners or sharp edges of the granules do not receive an excessive amount of energy and therefore, are not fused. Also, small granules and large granules automatically absorb their proper proportion of energy; one does not absorb too much and the other too little energy.

Figure 3:
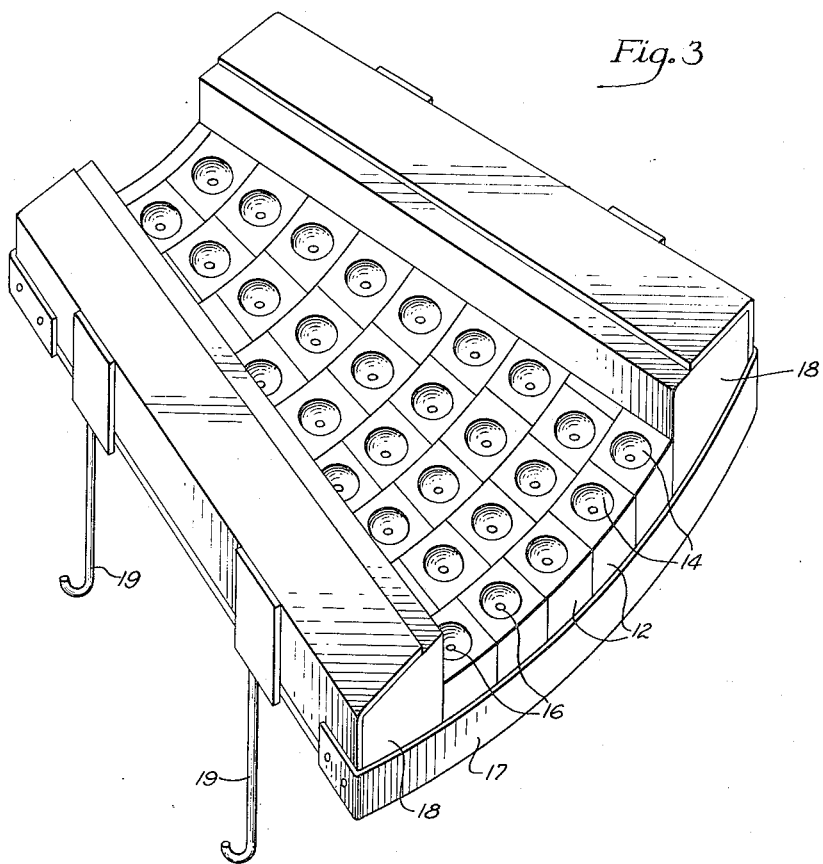
Fig. 3 is a bottom perspective view of a radiant heating unit for the furnace.

One form of heating apparatus is illustrated in Figs. 1, 2 and 3. As there shown the material is delivered as presently described to a conveying means here represented by a vibrating hearth 10 surfaced with refractory material over which the granules to be cellulated travel. The radiant heating energy unit 11 is here shown located above the hearth in relatively close proximity thereto, but unconnected therewith so that it is not subject to the vibrating action of the hearth. The heating unit (see Fig. 3) comprises in this instance a series of radiant heating elements 12 (see Fig. 6) which comprises a refractory 13 having a concave or hemispherical face 14. Gas mixed with the proper amount of air for efficient combustion is fed through the central conduit 15 of the element and is laterally deflected by a refractory tip 16, over the surface 14 where it burns practically on the surface 14 raising it to incandescence. The type of element just described is a Selas burner made by the Selas Company of Philadelphia, Pennsylvania. Another similar type of radiant energy burner is the Burdett burner made by the Burdett Manufacturing Company of Chicago, Illinois. Other burners which present an incandescent surface without accompanying jets of flame and heating gases may also be used for this purpose. The temperature at the incandescent face of these burners is about 2300° F.

No blast of gases issues from the heating elements. The gases of combustion are relatively gently diffused. Since heated gases are not employed to transmit heat to the granules no space need be provided for them in the heating chamber. Absence of any current or stream of gases eliminates the serious dust hazard which characterizes apparatus heretofore used. This also makes is possible easily to maintain an oxidizing or reducing atmosphere inside the chamber if this be desired in any case, by introducing a small amount of the proper gas therein. Control and adjustment of temperature is easily possible simply by operation of the valves 23, and since there is no large body of hot gas to control, the response to change in temperature is prompt.

As shown in Fig. 3 the assembly of burner element is enclosed on the top and sides by refractory insulation 17 and 18 respectively. The entire unit is suspended in close proximity to, but out of physical contact with the vibrating hearth 10, on suspending rods 19. Gas from the mixing apparatus (not shown) is delivered to the individual burner elements from the manifold 21 through pipes 22. Each element is provided with a control valve 23 for cutting off or regulating the temperature of each element.

The hearth is vibrated by conventional adjustable vibrating apparatus 24, in this case electrically and adjustably operated (as indicated diagrammatically at 32) and designed to cause the granules of material to travel over the hearth to the discharge end 25. Speed of travel of material and therefore, the time of exposure to radiant heat is regulated by the vibrating apparatus. Preferably the sides 26 of the hearth diverge towards the discharge end, thereby winding the hearth to provide additional area for and to prevent crowding of, the expanding granules.

Ore is delivered from the hopper 28 to the receiving end of the hearth at a uniform and regulated rate, by feeding apparatus 29, in this case electrically operated and controlled (as indicated diagrammatically at 31) to regulate the rate or volume of feed of material to the expander. Any appropriate adjustable feeding apparatus may be employed.

Figure 4:
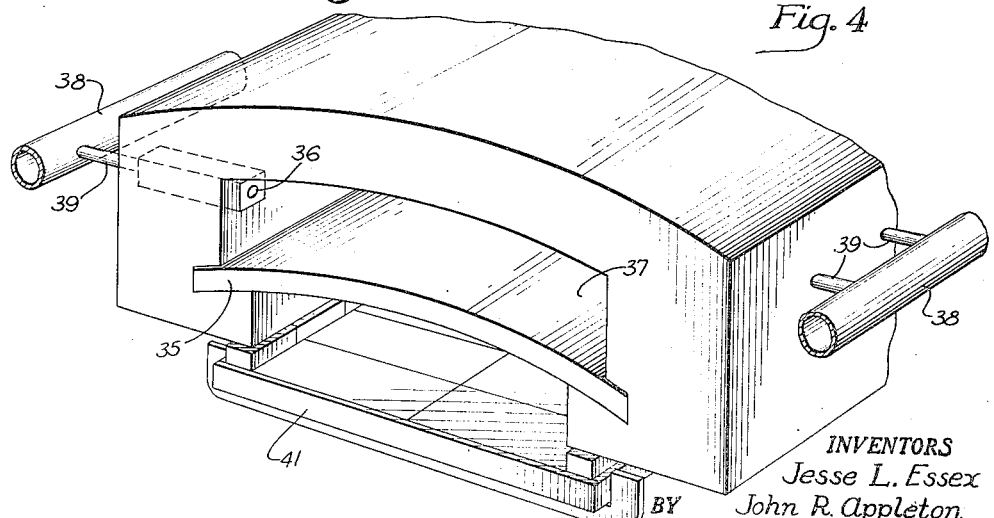
Fig. 4 is a view similar to that of Fig. 1 illustrating a different form of heating unit.

In Fig. 4 is illustrated another form heating appartus wherein the radiant energy is emitted from a refractory top or arch 35 which is heated to incandescence by burners 36 in the space 37 above the arch 35. Here also, as in the apparatus illustrated in Fig. 1, the radiant energy emitted by the incandescent arch 35 is substantially the sole source of heat energy. No current of hot gases is present. The burners 36 are supplied with gas properly mixed with air from the manifold 38 through individual pipes 39 leading to the several burners. The amount of gaseous mixture, and therefore the temperature, is regulated by control valves not shown.

The hearth 41 may be similar to that illustrated in Figs. 1 and 2 and may be similarly vibrated. The heating unit is preferably supported slightly above the sides of the hearth, so as not to be subjected to the vibrating action of the latter.

It will be apparent that the foregoing apparatus may advantageously be used to expand other materials, particularly where accurate control of temperature or time of exposure is necessary, or where a dust hazard is presented by furnaces, using a current of hot gases to deliver heat wholly or in part. The accurate control of expanding temperature and time of exposure makes it possible to expand material sufficiently and within close limits of the desired bulk density or strength. Also the furnace is useful for example, in expanding shales which require accurate control of temperature and time of exposure for efficient expansion. There is no current of gases in the chamber to disturb the reducing atmosphere maintained by the carbon and iron in the shale.

In Fig. 5 is illustrated a diagram or flow chart illustrative of the entire process. As there shown, the material to be expanded is delivered from the storage pile 43 to the hopper 44 from which it is elevated by an appropriate bucket elevator or the like 45 to the feeding hopper 46 and there delivered to the heating apparatus as described in connection with Fig. 1. Upon discharge from the heating apparatus it is delivered to a conventional de-stoning unit 47 which effects a gravity separation between the expanded material and the rock impurities. The latter are discharged into the receptacle 48. The expanded material is discharged into the bin 49 and dust is collected by cyclone separator 51. It is not carried into the atmosphere as heretofore by the current of heating gases.

It will be understood that the above described apparatus for expansion by radiant heat is illustrative only, since this phase of the invention is not limited to the details of the apparatus. Other types of apparatus wherein radiant energy is delivered to the granules of material, may be advantageously used if they function to deliver radiant energy substantially directly to the granules and constitute substantially the sole source of heat energy. Other means of feeding the granules through the furnace may be employed, such for example as a gravity feed wherein the granules fall or travel by gravity past the sources of radiant energy or through an inclined rotary tube or hearth which moves the granules past a source of radiant energy. Preferably means for regulating the time of travel should be provided so as to secure the most efficient expansion of the granules.

Obviously the invention is not limited to the details of the illustrative apparatus since these may be variously modified. Moreover, it is indispensable that all features be used conjointly since various features may be used to advantage in different combinations and sub-combinations.

Having described our invention, we claim:

1. Apparatus for cellulating expandable rocks and ores comprising in combination a hearth, means for moving a stream of said granules over said hearth, said hearth increasing in area towards its discharge end to accommodate the increased area required for the expanded granules, a source of radiant energy above said hearth spaced from but in close proximity to the stream of granules and constituting substantially the sole source of heat energy for expanding said granules, the temperature of said source being at least as high as the expanding temperature of the material, and means for collecting the expanded material after it passes out of the field of radiant energy.

2. Apparatus for expanding granules of mineral material involving creation of gas which comprises a vibrating expanding hearth widening toward its discharge end to compensate for the increase in volume of the expanded material, adjustable means for vibrating the hearth to vary the rate of travel of the material over the hearth, adjustable feeding means for regulating the rate of feeding of material to the hearth, a cover over the hearth to enclose the hearth except for entrance and exit openings, an incandescent refractory as the sole source of heat carried in said cover in relatively close proximity to said granules but spaced therefrom, said refractory being heated with gas without the discharge of hot gases of such velocity as to pick up dust from said granules, means for adjusting the temperature of said refractory, a substantially closed receiver for receiving the expanded material discharged from said hearth, and a dust collector for collecting the dust rising in said receiver.

3. Apparatus for expanding granules of mineral material which comprises a vibrating refractory hearth widening toward its discharged end to compensate for the increase in volume of the expanded material, adjustable means for vibrating the hearth to vary the rate of travel of the material over the hearth, adjustable feeding means for regulating the rate of supply of material to the hearth, a cover over the hearth to enclose the hearth except for entrance and exit openings, said cover carrying in its face a series of concave refractories heated to incandescence with a combustible gaseous mixture which burns substantially on the surface of the refractory, said refractories constituting substantially the sole source of heat and being out of contact with the stream of granular material traversing said hearth but directing heat upon said material to raise it to expanding temperatures, and means for regulating the supply of said gaseous mixture to vary the temperature of said refractories, whereby the temperature and time of exposure of said granules to said radiant heat may be adjusted to regulate the degree of expansion of said granules.

4. The method of expanding perlite granules with a minimum of shattering and fusing which comprises distributing granules of perlite in a relatively thin generally horizontal layer on a substantially flat supporting surface and moving said granules at a controlled rate through a chamber, directing rays of radiant heat energy toward said layer from above but in relatively close proximity thereto, the source of radiant energy being separated from said granules by an atmosphere in said chamber which is substantially non-absorbent of radiant energy and being at a controlled temperature within substantially the range of 1600° F. to 2300° F. to insure the development of expanding temperatures in the perlite with a minimum of shattering and fusion of the granules, said layer of perlite lying between said surface and said source of radiant heat thereby minimizing absorption of heat by said surface, controlling the rate of travel of said granules through said chamber thereby to control the duration of exposure of said granules to said radiant energy, expanding said granules substantially solely by means of said radiant energy to cause the granules to change their state and thereby become efficient radiating bodies, and re-radiating from the expanded granules energy received substantially in excess of that necessary to expand said granules to keep the granules at lower than fusing temperature, and then moving the expanded granules out of said chamber.

5. The method of expanding perlite granules with a minimum of shattering and fusing which comprises distributing granules of perlite in a relatively thin generally horizontal layer on a supporting surface and moving said granules at a controlled rate into and through an expansion chamber, exposing the granules while traversing said chamber to heat energy from above and directed toward said layer and in relatively close proximity thereto, said source of energy being within substantially the range of 1600° F. to 2300° F. and consisting substantially entirely of rays of radiant heat energy directed toward the layer of granules to insure generation of expanding temperatures in the perlite granules with a minimum of shattering and fusion of the granules, said source being separated from said layer of granules only by an atmosphere which is substantially non-absorbent of radiant energy and being generally coextensive with the layer of perlite granules in said expansion chamber, said radiant energy preserving a substantially quiescent atmosphere so as not to create dust from fine particles of perlite in said chamber, controlling the rate of travel of said granules through said chamber, continuing exposure of the granules to said radiant energy until they expand and thereby change their state and become sources of radiant heat and reflect back as radiant energy the major portion of the radiant heat received after reaching expansion temperature and expanding to keep the granules at lower than fusing temperature, and then removing the expanded granules from said chamber.

JESSE L. ESSEX.
JOHN R. APPLETON.

REFERENCES CITED

The following references are of record in the file of this patent:

UNITED STATES PATENTS

| Number | Name | Date |
| --- | --- | --- |
| 1,695,950 | Carpenter | Dec. 18, 1928 |
| 1,992,669 | Labus | Feb. 26, 1935 |
| 2,029,524 | Denning | Feb. 4, 1936 |
| 2,039,833 | Payne | May 5, 1936 |
| 2,061,698 | Ewart | Nov. 24, 1936 |
| 2,265,358 | Denning | Dec. 9, 1941 |
| 2,326,163 | Patterson | Aug. 10, 1943 |
| 2,420,126 | Curll et al. | May 6, 1947 |

OTHER REFERENCES

Perlite, Source of Synthetic Pumice, Bureau of Mines IC 7364, August 1946, pages 2, 3 and 5.